United States Patent
Scaries

(10) Patent No.: US 6,385,895 B1
(45) Date of Patent: May 14, 2002

(54) COLLAPSIBLE ANIMAL DECOY

(76) Inventor: Joseph L. Scaries, Rte. 3, P.O. Box 5245, Berkeley Springs, WV (US) 25411

( * ) Notice: Subject to any disclaimer, the term of this patent is extended or adjusted under 35 U.S.C. 154(b) by 0 days.

(21) Appl. No.: 09/531,844

(22) Filed: Mar. 20, 2000

Related U.S. Application Data
(60) Provisional application No. 60/149,560, filed on Aug. 18, 1999.

(51) Int. Cl.[7] ............................................. A01M 31/06
(52) U.S. Cl. ........................................................... 43/2
(58) Field of Search ............................ 43/2, 3; 135/16, 135/19.5, 20.1, 20.3, 21, 33.2, 33.7, 91, 901

(56) References Cited

U.S. PATENT DOCUMENTS

| | | | |
|---|---|---|---|
| 547,032 A | * 10/1895 | Ross | 43/3 |
| 565,619 A | * 8/1896 | Haynes | 135/21 |
| 694,732 A | 3/1902 | Coudon | 43/3 |
| 812,499 A | * 2/1906 | Johnston | 43/3 |
| 833,966 A | * 10/1906 | Johnston | 43/3 |
| 1,378,354 A | * 5/1921 | Johnson | 135/26 |
| 2,266,684 A | * 12/1941 | Brown | 135/16 |
| 2,439,167 A | * 4/1948 | Jackson | 43/3 |
| 2,545,800 A | 3/1951 | Viken | 43/3 |
| 2,683,466 A | * 7/1954 | Small | 135/20.3 |
| 2,812,608 A | 11/1957 | Jones | 43/3 |
| 2,905,187 A | * 9/1959 | Croce | 135/20.1 |
| 3,456,661 A | * 7/1969 | Farley | 135/33.7 |
| 3,470,645 A | * 10/1969 | Mattison | 43/3 |
| 4,284,095 A | * 8/1981 | Norton | 135/21 |
| 4,689,913 A | * 9/1987 | Brice | 43/3 |
| 4,798,219 A | * 1/1989 | Forde | 135/16 |
| 4,829,694 A | 5/1989 | Oasheim | 43/1 |
| 4,838,290 A | * 6/1989 | Wu | 135/16 |
| 4,880,023 A | * 11/1989 | Lin | 135/16 |
| 4,915,670 A | * 4/1990 | Nesbit | 135/16 |
| 4,998,551 A | * 3/1991 | DeSarno | 135/33.7 |
| 5,158,102 A | * 10/1992 | Lemcke | 135/33.2 |
| 5,293,889 A | * 3/1994 | Hall et al. | 135/16 |
| 5,390,686 A | * 2/1995 | Lin et al. | 135/20.3 |
| 5,459,958 A | * 10/1995 | Reinke | 43/2 |
| 5,503,585 A | * 4/1996 | Heineman | 43/2 |
| 5,505,221 A | * 4/1996 | Gao | 135/20.1 |
| 5,595,012 A | 1/1997 | Coleman | 43/3 |
| 6,216,382 B1 | 4/2001 | Lindaman | 43/2 |

OTHER PUBLICATIONS

Photocopy of product advertisement for a "Turkey Decoy Expander with Metal Mounting Stake," available from Buck Wing Products, Inc.
Photocopy of product advertisement for a "Turkey Decoy Expander with Metal Mounting Stake," available from Buck Wing Products, Inc.

* cited by examiner

*Primary Examiner*—Darren W. Ark
(74) *Attorney, Agent, or Firm*—Steptoe & Johnson PLLC

(57) ABSTRACT

A collapsible animal decoy is disclosed wherein a cover is disposed over a frame having a plurality of struts pivotally attached to an opening mechanism slidably disposed on an elongated shaft, forming an animal shape having a body, neck and head portion. The opening mechanism has an open position and a closed position. In the open position, the opening mechanism is positioned at the top end of the elongated shaft and the plurality of struts are extended outward. In the closed position, the opening mechanism is positioned at the handle end of the elongated shaft and the plurality of struts are collapsed against the elongated shaft for storage and transport. In addition, the struts freely rotate around the elongated shaft to give the decoy a realistic movement. A means for emitting an animal call may be incorporated into the shaft such that the rotation of the frame causes the decoy to emit the animal call. Also, the handle end of the elongated shaft may be secured to the ground or tree via a tether or pointed peg.

21 Claims, 6 Drawing Sheets

COLLAPSIBLE ANIMAL DECOY

CROSS-REFERENCE TO RELATED APPLICATIONS

This application claims the benefit of U.S. application Ser. No. 60/149,560, filed Aug. 18, 1999.

BACKGROUND OF THE INVENTION

1. Field of Technology

The present invention relates to animal decoys, and more particularly, to animal decoys having an internal frame that collapses and folds for transport and storage.

2. Related Art

Hunters have been using decoys for years. This is true for hunters seeking fowl, e.g., geese, ducks, and turkey, as well as for those seeking other small and big game animals, e.g., squirrels, rabbit, and deer. Most conventional decoys are typically very cumbersome in that they have rigid forms which do not collapse into a more manageable size for transport and storage. Other decoys use a "wind-sock" structure wherein there is no internal frame giving the decoy fullness. These decoys require wind to be effective, and even then they will only point in the direction in which the wind is blowing.

Another type of conventional decoy has an internal structure with a flexible covering mimicking a specific bird or animal. Most of these decoys, however, have certain disadvantages associated with them. Some examples of such decoys follow.

In U.S. Pat. No. 5,595,012 to Coleman a bird decoy is disclosed having a frame that represents a three-dimensional outline of a head, neck and body of a waterfowl and having an air-tight light-weight, flexible covering disposed about the outside of the frame. Although the decoy is said to be stackable with other such decoys, there is no easy way to transport these decoys into the field for use. That is, the Coleman decoy does not collapse into a compact unit. Therefore, it is very cumbersome for a hunter to carry these decoys into the field because the hunter would have to use both hands to carrying the decoy(s). As a result, the hunter would have to make several trips into the field to deploy the decoy(s) and to bring other necessary equipment.

In U.S. Pat. No. 4,829,694 to Oasheim, a decoy/blind combination is disclosed wherein a hunter may hide within a blind that has the outward appearance of a bird, thereby acting as a decoy. This is also a cumbersome apparatus in that the decoy/blind must be large enough for a person to sit within it. Therefore, a hunter would not be able to transport this, and his/her other needed equipment, a long distance.

In U.S. Pat. No. 2,812,608 to Jones a goose decoy is disclosed having a wire frame that collapses into a flat shape "for the convenience of carrying many decoys under the arm of the hunter." Although this decoy collapses, it still requires a hunter to relinquish valuable arm capacity during transport of the decoys. A hunter will have to make several trips in order to transport a plurality of decoys and other needed equipment to a selected hunting site.

In U.S. Pat. No. 2,545,800 to Viken, et al., a folding goose and duck decoy is disclosed having a three dimensional head and tail that are removably attached to the folded frame. As with the other prior art decoys, this folding structure is very cumbersome. The decoy body folds flat and the head and tail may be removed and carried separate from the folded body. A hunter must carry multiple pieces to transport this decoy to the selected hunting site, thereby requiring multiple trips.

In U. S. Pat. No. 694,732 to Coudon, a decoy device is disclosed wherein three decoys are connected together representing a grouping of decoys. These decoys are basically two dimensional representations of a bird that are permanently connected together. During transport, a hunter simply folds the three decoys to a closed position. As with the other prior art, this decoy device also requires a hunter to hand-carry this devise, resulting in the hunter making multiple trips into the field.

In addition to the above patented decoys, a new product has appeared on the market called a "turkey decoy expander with metal mount." The patent-pending expander is an umbrella shaped internal stand having eight metal arms that expands within a collapsible decoy to give the decoy support and a shape. This product has several disadvantages. First, it requires a hunter to carry three separate components: an expander, a stake, and a collapsible decoy. This is very cumbersome and inconvenient in that the hunter can easily lose one or more components. Second, the hunter must assemble a decoy using these separate components resulting in extra set-up time and perhaps extra noise (an undesirable element when hunting or seeking game). Third, the expander and stake components do not appear to collapse into a small, light-weight unit for storage and transport. This adds to the awkwardness in carrying and using the product.

Therefore, there is a need for a light-weight animal decoy, whether for mammals or fowl, that collapses into a compact form which can be attached to a hunters belt or pack, thereby freeing the hunter's hands for carrying other equipment. In addition, there is a need for a light-weight animal decoy that is full function and does not require added components, such as a separately added head or tail.

Because hunting is a chancy endeavor with quick and fleeting opportunities for the hunter, the hunter must be quick and efficient in his/her actions; especially in decoying, when the prey must be close at hand but, hopefully, not aware of the hunter's presence. The hunter must move quickly and quietly to his/her chosen area or spot, then very quickly, quietly, and efficiently, set up the decoy(s) before he/she is discovered. The hunter may need to move the decoy(s) one or more times to different locations, or into different patterns or groupings, during the course of the hunt before bringing the prey in close enough for action.

Therefore, there is a need for a light-weight and simple decoy that is easily deployed and collapsed such that a hunter can efficiently and quickly relocate the decoys.

SUMMARY OF THE INVENTION

The present invention is a unique, light-weight, easy storing and carrying, fast deploying, full body animal decoy. In essence, the decoy of the present invention combines "umbrella" technology with the design of bird and other animal decoys. That is, the decoy comprises a collapsible frame over which a cover is disposed forming the shape of a specific animal, e.g., a mammal or bird.

The frame of the present invention comprises an elongated shaft and a plurality of struts that are connected to an opening mechanism slidably disposed on the shaft. The struts can be moved between a closed position, wherein the struts are folded or collapsed against the elongated shaft, and an open position, wherein the struts are extended outward from the elongated shaft. The hunter slides the opening mechanism along the elongated shaft to deploy the decoy into the open position and to collapse the decoy into the closed position. In an alternative embodiment, the struts may be deployed using an automatic spring loading opening mechanism. This structure and function of the instant invention is similar to that of general umbrella technology.

There are many advantages of a decoy of the present invention. First, the decoy employs an umbrella-type technology, thereby making the decoy easy to deploy and collapse. For example, the decoy is easily deployed into an open position, taking mere seconds, about five (5) seconds, to set up for use. Also, the decoy is easily collapsed into a closed position, taking mere seconds, about seven (7) seconds, to recover, store and be ready for transport. Therefore, about twenty (20) goose decoys can be deployed easily in three (3) to four (4) minutes, including spotting.

Second, the decoy is extremely light weight and small in size, making it easy for a hunter to carry and use. The decoy can be easily strapped to a hunter's belt or pack, thereby requiring minimal effort for the hunter to carry and allowing the hunter's hands to be free to carry other equipment. For example, a goose or turkey decoy of the present invention in the closed position comprises a cylinder of about one (1) foot in length, 1.5 inches in diameter, and about one half (½) a pound in weight. Therefore, a gaggle of about twenty (20) geese decoys weighs about ten (10) pounds and could be stored and carried in a bag about one (1) foot deep and ten (10) inches in diameter.

Third, the decoy can be easily secured to the ground, a tree or other cover, thereby improving the life-like quality of the decoy.

Fourth, the extreme lightweight versus surface area of the decoy results in only a slight air movement being needed to rotate the decoy around the elongated shaft or swing the decoy if in a tree, thereby resulting in realistic movement of the decoy and improving its effectiveness.

Fifth, the decoys can easily and accurately mimic the sight and sound of wings flapping by manually and rapidly working the sliding mechanism up and down the elongated shaft. That is, by rapidly opening and closing the umbrella-like function of the decoy. This action results in the body portion of the decoy to collapse then re-open in succession, thereby imitating the flapping of a goose's wings.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION OF THE PREFERRED EMBODIMENTS

Figure 1:
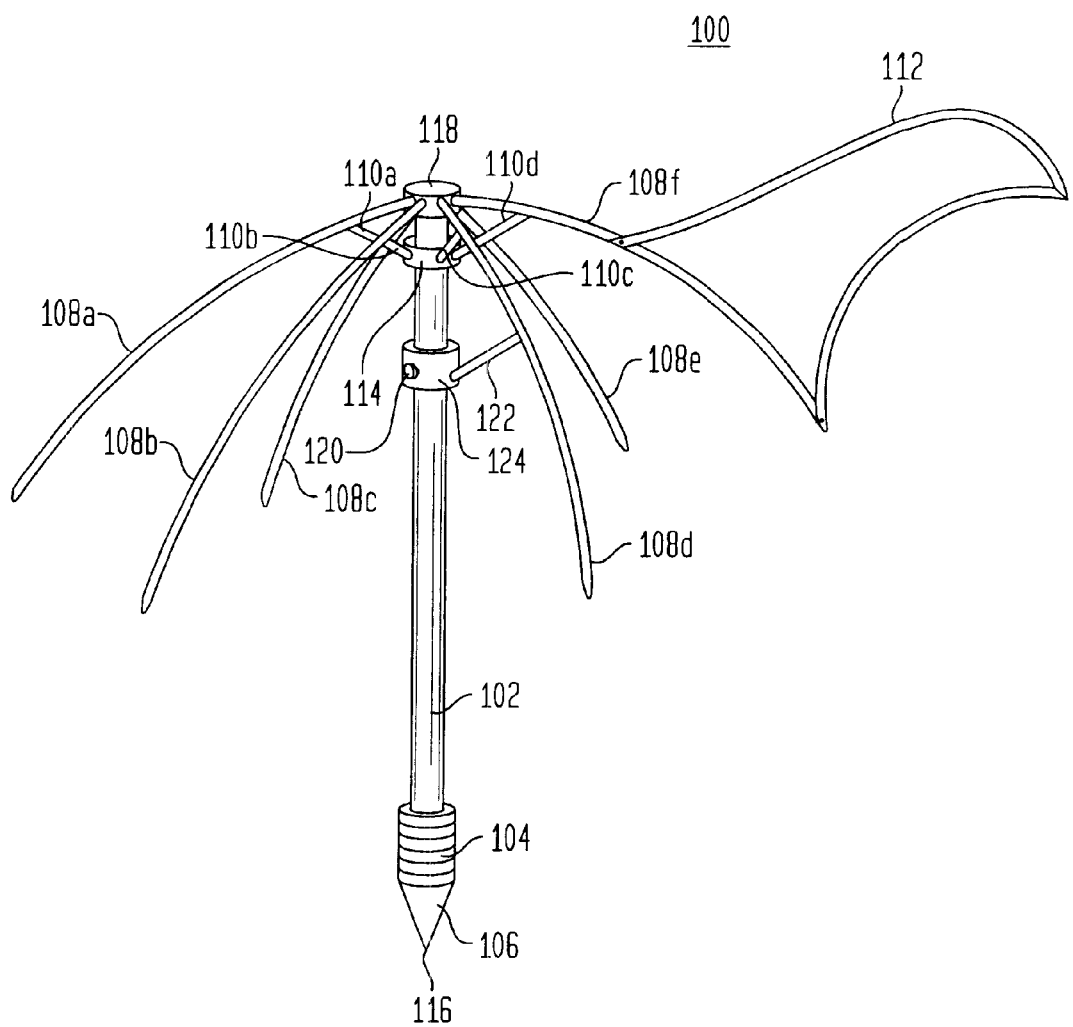
FIG. 1: A perspective view of a framework of a collapsible animal decoy of the present invention.
Figure 2:
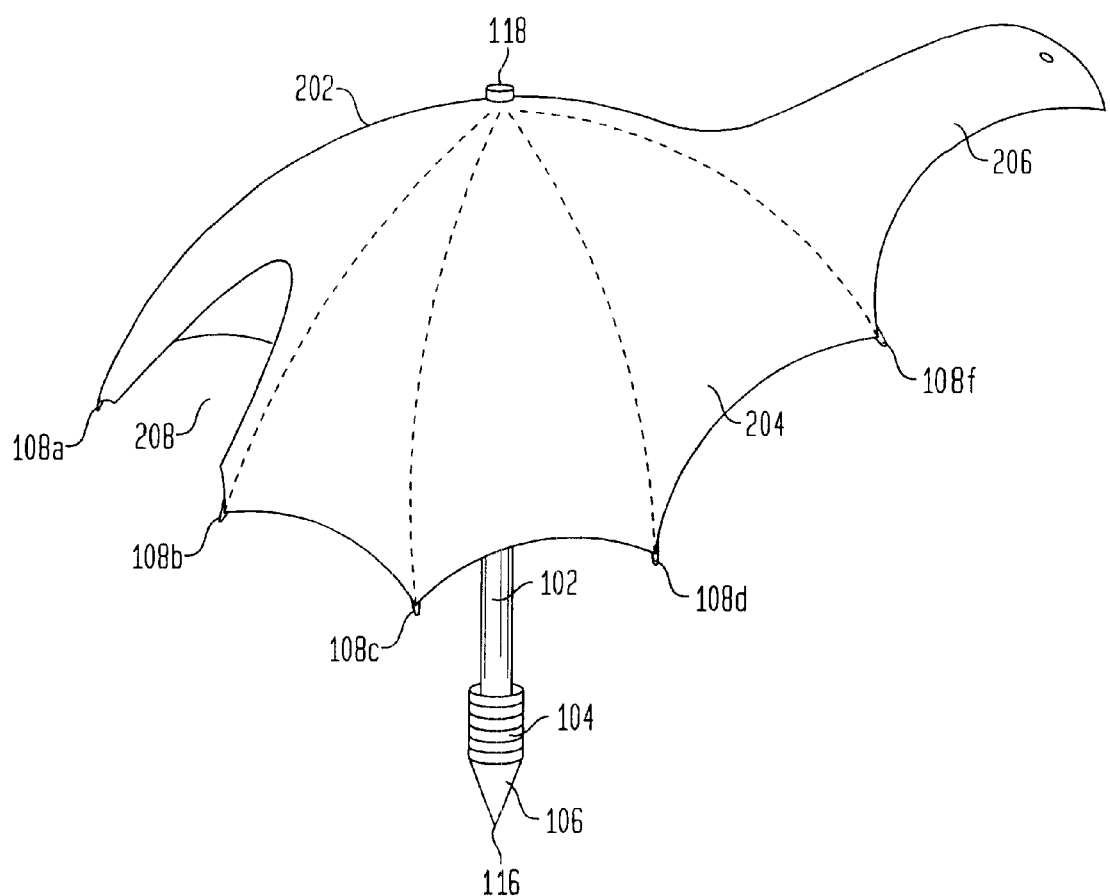
FIG. 2: A perspective view of the collapsible animal decoy with a cover.
Figure 5:
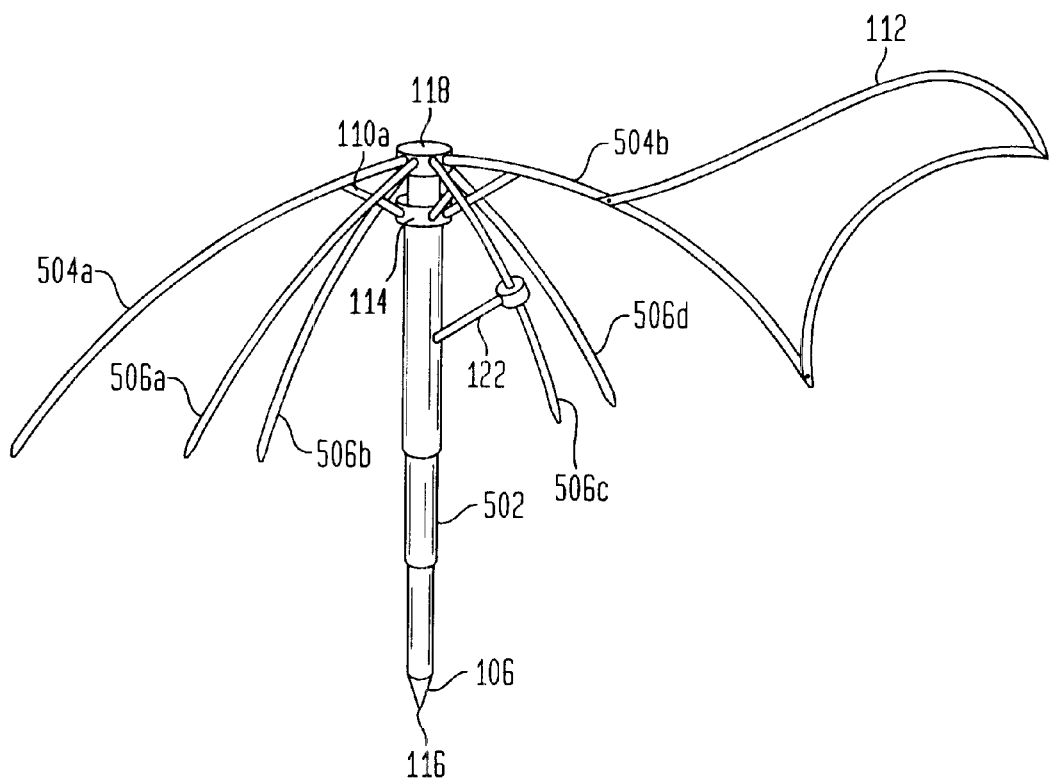
FIG. 5: A perspective view of an alternative embodiment of the collapsible animal decoy.

FIGS. 1–2 are perspective views of a collapsible animal decoy (the "decoy") 200 of the present invention. FIG. 5 is a perspective view of an alternative collapsible animal decoy. Specifically, the decoy 200 of the present invention is shown as a turkey decoy, but this is for convenience purpose only. The decoy 200 of the present invention is equally applicable to any other animal, including but not limited to, birds, water fowl, and small mammals.

As shown, the decoy 200 comprises an elongated shaft 102 having a handle end 116 with a handle 104, a top end 118, and an opening mechanism 114 that is slidably disposed on the elongated shaft 102. The elongated shaft 102 may be a fixed length or a telescopic shaft 502 that becomes longer as the decoy 200 is opened. A plurality of struts 108a–f are pivotally attached to the top end 118 of the decoy 200 and are pivotally attached to the opening mechanism 114 by a plurality of support struts 110a–d.

In addition, the struts 108a–f may have one or more joints to assist in their collapsing and folding into a compact position for storage and transport. For example, one or more struts 108a–f can comprise a plurality of hinges, e.g., double or triple hinges, depending on the requirement of the finished decoy 200. For example, a decoy requiring a longer body shape may have struts 108a–f having three hinges along their length, thereby allowing the struts to produce the proper shape for the decoy while retaining the ability to collapse for storage. The use of multiple hinges for the struts 108a–f results in an even more compact unit when in the closed position.

In combination, the elongated shaft 102, the struts 108a–f, the support struts 110a–d and the opening mechanism 114 comprise a "frame" 100 that functions in a manner similar to a conventional umbrella. The frame 100 of the decoy 200 also comprises a head strut 112 that extends outward from struts 108a–f. The head strut 112 has a shape of a head and neck of the animal being depicted by the decoy 200. In the preferred embodiment, the head strut 112 is pivotally attached to a strut 108f by conventional means, e.g., a pin, clip, clasp, or other fastener. For convenience only, the head strut 112 as shown herein is directed to that of a turkey. The head strut 112 can be made to represent the head and neck of any selected animal.

The decoy 200 also comprises a cover 202 that is disposed over the struts 108a–f and the head strut 112 and forms an animal shape having a body portion 204 and a neck and head portion 206. The cover 202 is attached to the frame 100 as by conventional means used for umbrellas, e.g., ties, adhesive, and any comparable means. The cover 202 may be made of any fabric, plastic or other material and have any color patter or design needed to emulate a specific animal. Therefore, when the decoy 200 is in the open position, the decoy 200 has the shape and look of the selected animal. It should also be understood that the frame 100 of the present invention may be used with any type of cover 202, wherein a hunter may adapt a frame of the present invention to any type of animal cover.

The struts 108a–f of the present invention can be all the same length, or can be of variable length to represent an animal having an elongated shape. For example, the struts 108a,b,e,f used to represent the front and back of an animal may be longer than the struts 108c,d used to represent the sides of the animal. The head strut 112 is pivotally attached to one of the remaining struts 108f that represents the front of the animal. When in the closed position, the head strut 112 folds or collapses along the other struts 108a–f. See FIG. 3.

The sliding mechanism 114 of the decoy 200 is one used in conventional umbrellas and is engaged by conventional umbrella deployment means. That is, a hunter may manually slide the sliding mechanism 114 up the elongated shaft 102 until the struts 108a–f are deployed in the open position. See FIG. 1 for the frame 100 to be in the open position. Then, when desired, the hunter simply slides the sliding mechanism 114 back down the elongated shaft 102 until the struts 108a–f collapse and fold into the closed position. See FIG. 3 for the frame 100 in the closed position. In the alternative, a hunter may press a button at the handle end 116 of the elongated shaft 102 to open the decoy 200. In this embodiment, the opening mechanism 114 is a spring mechanism which is well known and commercially available.

Also in the preferred embodiment, the frame 100 of the decoy 200 can rotate around the opening mechanism 114. Therefore, given a slight amount of wind, the decoy 200 will move and rotate, thereby increasing its effectiveness.

Figure 6:
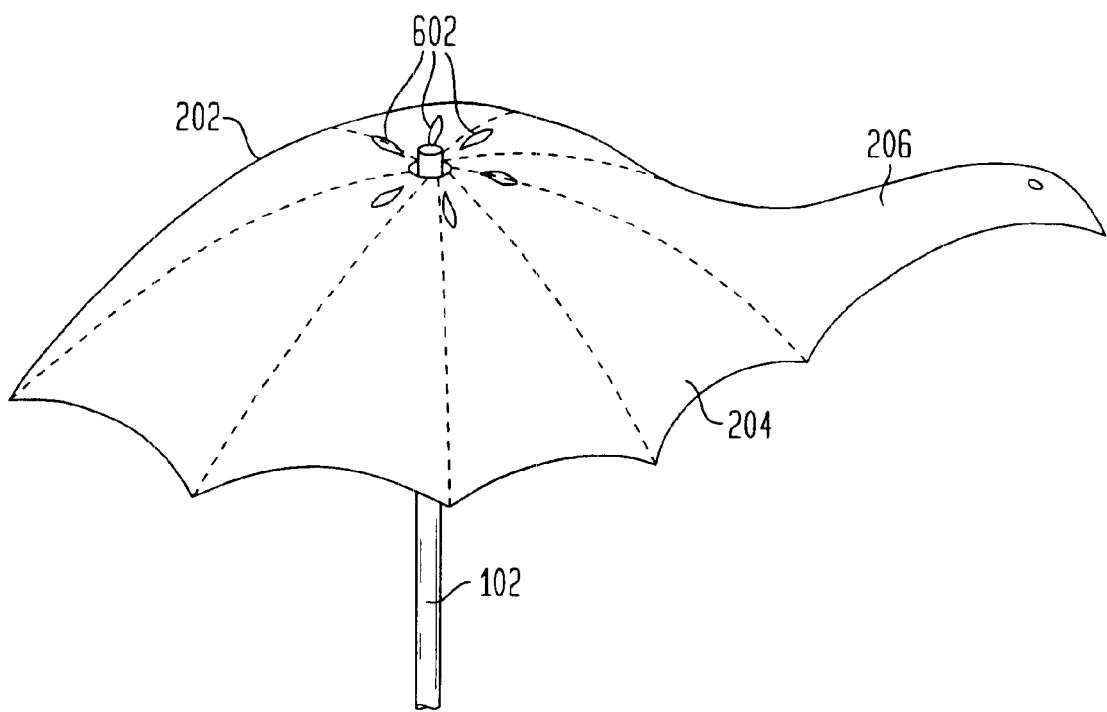
FIG. 6: A perspective view of a cover of the collapsible animal decoy having slits to prevent lift.

The preferred embodiment of the cover 202 of the present invention also comprises a wind hole 208 which is a hole in the cover 202 at a location that represents the back of the animal being represented, opposite the head strut 112. The wind hole 206 provides the means by which the wind can pass through the decoy 200 and not "lift" the decoy 200 off the ground. The use of the shown wind hole 206 is for convenience purposes only. It would be readily apparent for one of ordinary skill in the relevant arts to use an alternative means for preventing lift, wherein other such means may include, one or more slits 602, as shown in FIG. 6, or one or more small holes, cut in the cover 202.

The preferred embodiment also comprises a pointed end 106 located at the end of the handle 104 which provides a means for securing the decoy 200 to a base, e.g., the ground or a tree. The use of a pointed end 106 is for convenience purposes only. It would be readily apparent for one of ordinary skill in the relevant arts to use an alternative means for securing the decoy 200 to the ground, e.g., a loop and stake, a tether, screw.

Similarly, the present invention also comprises a means for suspending the decoy 200 from point off of the ground, e.g., from a tree limb. The preferred means for suspending the decoy 200 is an "eye" hook rigidly attached to the top end 118 of the decoy 200. Therefore, to suspend the decoy 200, the hunter merely has to tie a rope or string to the eye hook and raise the decoy 200 off the ground, or alternatively, latch the eye hook over a peg already positioned above the ground.

The decoy 200 of the present invention also comprises a means for emitting an animal call. In the preferred embodiment, the means for emitting an animal call is a sound box 124 rigidly attached to the elongated shaft 102. The sound box 124 may also be removably attached to the elongated shaft 102 in case a hunter wants a silent decoy 200. The means for attaching the sound box 124 is a screw 120, however, this is for convenience purpose only. It would be readily apparent for one of ordinary skill in the relevant art to attach a sound box 124 to the elongated shaft 102 by a comparable means.

The preferred means for emitting an animal call also comprises a striking bar 122 rigidly attached to a strut 108d of the frame 100. The striking bar 122 has a first end and a second end, wherein the first end is secured to the strut 108d of the frame 100 and the second end engages the said sound box 124. In operation, as the struts 108a–f rotate around the elongated shaft 102, the second end of the striking bar 122 engages the sound box 124 and generates the animal call, e.g., a turkey call.

The positioning of the sound box 124 and the striking bar 122 are for convenience purpose only. It would be readily apparent to one of ordinary skill in the relevant art to use a sound box 124 and striking bar 122 in a different arrangement, e.g., the sound box 124 attached to one or more struts 108d and the striking bar 122 attached to the elongated shaft 102.

Figure 3:
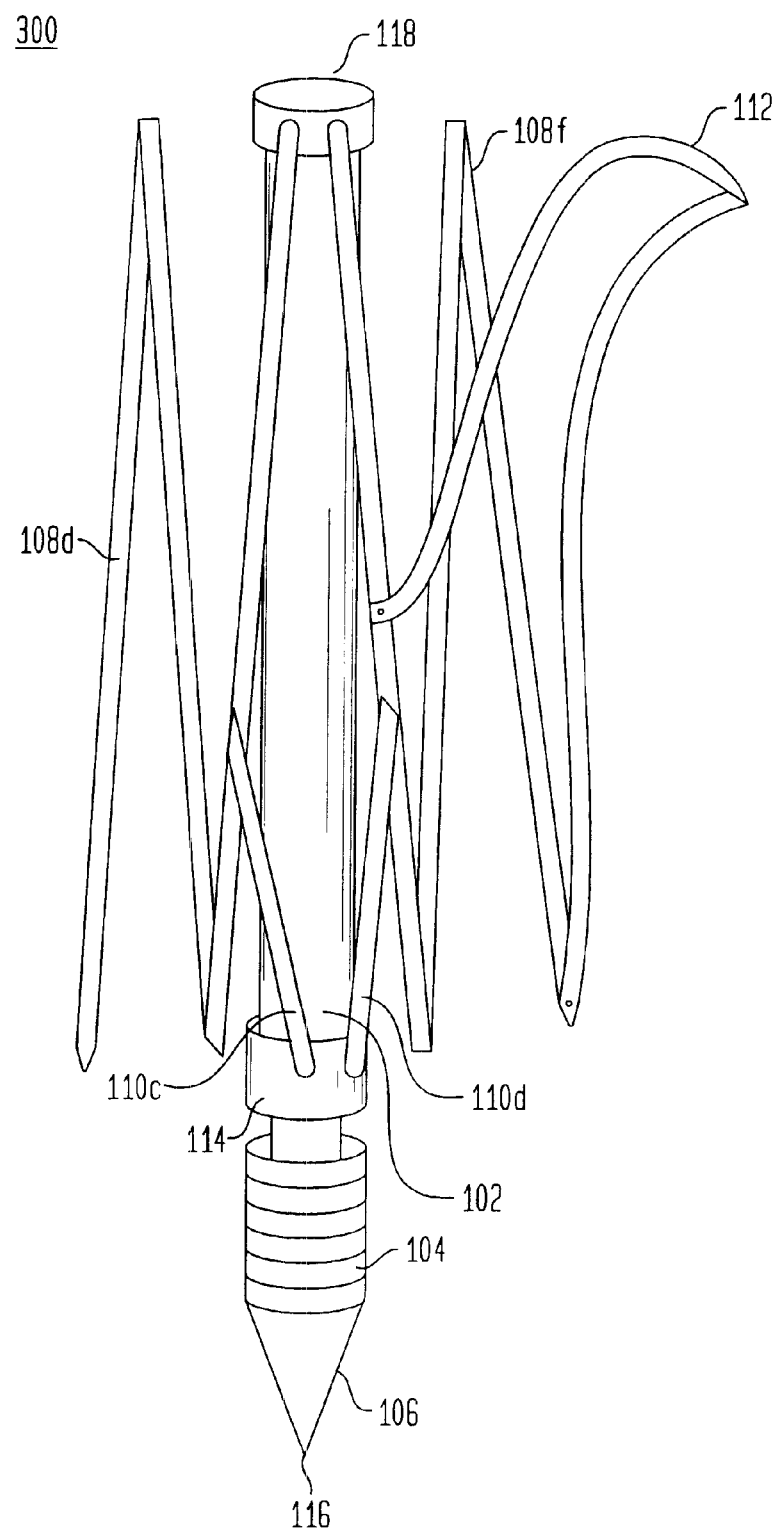
FIG. 3: A perspective view of a portion of the framework of the collapsible animal decoy in a stored position.

FIG. 3 is a perspective view of a portion of the frame 100 of the collapsible animal decoy in a stored position. For convenience purpose only, only two struts 108d,f are shown in the collapsed and folded position. However, all struts 108a–f operate in a similar fashion such that when the opening mechanism 114 is in the closed position, all struts 108a–f are collapsed against the elongated shaft 102. The head strut 112 also folds inward and against the struts 108a–f when the opening mechanism 114 is slid into the closed position.

Figure 4:
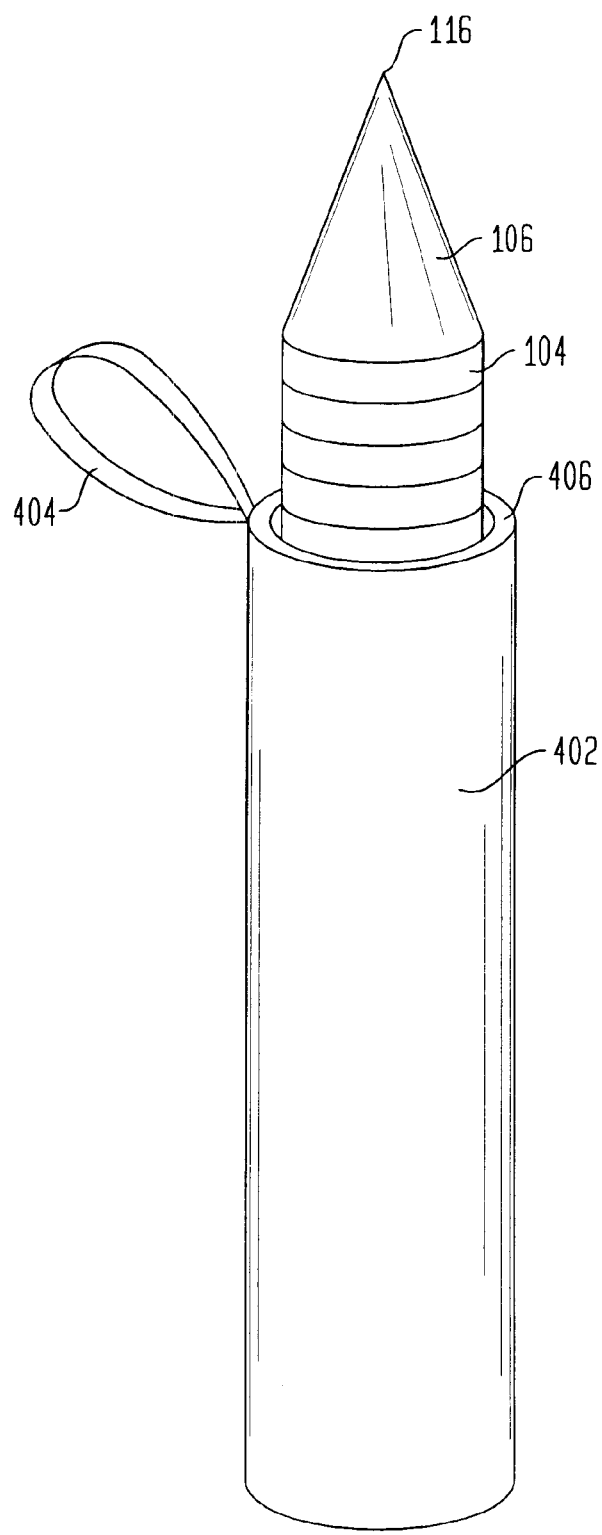
FIG. 4: A perspective view of the decoy in a closed position and stored in a storage container.

When in the closed position, the decoy 200 of the present invention can be easily stored and transported in a tubular storage container 402. See FIG. 4. A tubular storage container 402 may be either a soft container made of fabric or a rigid container made of plastic or other compound. When stored, the closed decoy 200 is inserted top end 118 first with the handle end 116 sticking out of the top 406 of storage container 402. The storage container 402 can then be attached to the hunter's belt for transport by a belt loop 404 or similar means.

In operation, to deploy the decoy 200, the hunter simply grabs the handle 104 of the decoy 200 and pulls it from the storage container 402. Once the decoy 200 is free from the storage container 402, the hunter engages the sliding mechanism 114 to open the decoy 200 into the open position. As discussed above, the hunter may either manually slide the sliding mechanism 114 up the elongated shaft 102 until it reaches the top end 118, or in the alternative, the hunter may push a button located at the handle end 116 of the elongated shaft 102 that causes the decoy 200 to open via a spring mechanism.

Once the decoy 200 is in the open position, the hunter secures the handle 104 to the ground, or a tree, such that the decoy 200 appears like the real animal that it is trying to emulate. As shown, the decoy 200 of this embodiment is a wild turkey. Therefore, the hunter secures the decoy 200 to the ground by embedding the pointed end 106 into the dirt to represent a wild turkey standing or walking.

Conclusion

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments, but should be defined in accordance with the specification and any equivalents.

What is claimed is:

1. A decoy, comprising:
   a frame, comprising:
      an elongated shaft having a handle end and a top end,
      an opening mechanism that is slidably disposed on said elongated shaft resulting in said frame having a closed position and an open position,
      a plurality of support struts pivotally attached to said opening mechanism, and
      a head strut for forming a head and neck of an animal or fowl, connected to and extending from only one of said support struts wherein said head strut extends outward from said only one of said support struts when in said open position, said head strut including first and second ends which are attached at separate locations along a length of said only one of said support struts thereby forming a space bounded by said head strut and said only one of said support struts, wherein in said closed position, said opening mechanism is positioned at said handle end of said elongated shaft and said plurality of support struts and said head strut are collapsed against said elongated shaft, and wherein in said open position, said opening mechanism is positioned at said top end of said elongated shaft and said plurality of support struts and said head strut are extended outward from said elongated shaft; and a cover disposed over said plurality of support struts and said head strut such that when said frame is in the open position, said cover creates an appearance of an animal or fowl having a body portion, neck portion, and head portion.

2. The decoy according to claim 1, wherein said shaft is a telescoping shaft.

3. The decoy according to claim 1, wherein said plurality of support struts are equal in length.

4. The decoy according to claim 1, wherein said plurality of support struts are of two or more lengths resulting in an elongated animal shape.

5. The decoy according to claim 1, wherein one or more of said plurality of support struts have one or more hinges.

6. The decoy according to claim 1, further comprising a means for securing said handle end of said elongated shaft to a base.

7. The decoy according to claim 6, wherein said means for securing said handle end is attached to said handle end and is selected from the group of a screw, a pointed peg, and a tether.

8. The decoy according to claim 1, wherein said cover further comprises a means for preventing lift of the decoy.

9. The decoy according to claim 8, wherein said means for preventing lift comprises a wind hole.

10. The decoy according to claim 8, wherein said means for preventing lift comprises one or more slits in said cover.

11. The decoy according to claim 1, further comprising a means for emitting an animal call.

12. The decoy according to claim 1, wherein said frame rotates around said elongated shaft in response to wind.

13. The decoy according to claim 1, further comprising a means for transporting the decoy.

14. The decoy according to claim 13, wherein said means for transporting the decoy is selected from the group of a belt loop, tie, strap, clip, and fastener.

15. A frame, comprising:
an elongated shaft having a handle end and a top end;
an opening mechanism that is slidably disposed on said elongated shaft resulting in the frame having a closed position and an open position; and
a plurality of struts pivotally attached to said opening mechanism;

wherein in said closed position, said opening mechanism is positioned at said handle end of said elongated shaft and said plurality of struts are collapsed against said elongated shaft, and wherein in said open position, said opening mechanism is positioned at said top end of said elongated shaft and said plurality of struts are extended outward from said elongated shaft;

a means for emitting an animal call;
wherein said frame rotates around said elongated shaft and said means for emitting an animal call comprises:
a sound box;
a means for attaching said sound box to said elongated shaft; and
a striking bar, having a first end and a second end, wherein said first end is secured to one of said struts of said frame and said second end engages said sound box, such that as said frame rotate around said elongated shaft, said second end of said striking bar engages said sound box and generates the animal call.

16. A frame, comprising:
an elongated shaft having a handle end and a top end;
an opening mechanism that is slidably disposed on said elongated shaft resulting in the frame having a closed position and an open position; and
a plurality of struts pivotally attached to said opening mechanism;

wherein in said closed position, said opening mechanism is positioned at said handle end of said elongated shaft and said plurality of struts are collapsed against said elongated shaft, and wherein in said open position, said opening mechanism is positioned at said top end of said elongated shaft and said plurality of struts are extended outward from said elongated shaft;

a means for emitting an animal call;
wherein said frame rotates around said elongated shaft and said means for emitting an animal call comprises:
a sound box;
a means for attaching said sound box to one or more of said support struts of said frame; and
a striking bar, having a first end and a second end, wherein said first end is secured to said elongated shaft and said second end engages said sound box, such that as said frame rotates around said elongated shaft, said second end of said striking bar engages said sound box and generates the animal call.

17. A decoy, comprising:
a frame, comprising:
an elongated shaft having a handle end and a top end,
an opening mechanism that is slidably disposed on said elongated shaft resulting in said frame having a closed position and an open position, and
a plurality of struts pivotally attached to said opening mechanism, wherein in said closed position, said opening mechanism is positioned at said handle end of said elongated shaft and said plurality of struts are collapsed against said elongated shaft, and wherein in said open position, said opening mechanism is positioned at said top end of said elongated shaft and said plurality of struts are extended outward from said elongated shaft; and a cover disposed over said plurality of struts and forming an animal shape having a body portion, neck portion, and head portion;

a means for emitting an animal call;
wherein said frame rotates around said elongated shaft in response to wind and said means for emitting an animal call comprises:

a sound box;

a means for attaching said sound box to said elongated shaft; and a striking bar, having a first end and a second end, wherein said first end is secured to one of said struts of said frame and said second end engages said sound box, such that as said frame rotates around said elongated shaft in response to wind, said second end of said striking bar engages said sound box and generates the animal call.

18. A decoy, comprising:

a frame, comprising:

an elongated shaft having a handle end and a top end, an opening mechanism that is slidably disposed on said elongated shaft resulting in said frame having a closed position and an open position, and a plurality of struts pivotally attached to said opening mechanism, wherein in said closed position, said opening mechanism is positioned at said handle end of said elongated shaft and said plurality of struts are collapsed against said elongated shaft, and wherein in said open position, said opening mechanism is positioned at said top end of said elongated shaft and said plurality of struts are extended outward from said elongated shaft; and a cover disposed over said plurality of struts and forming an animal shape having a body portion, neck portion, and head portion;

a means for emitting an animal call;

wherein said frame rotates around said elongated shaft in response to wind and said means for emitting an animal call comprises:

a sound box;

a means for attaching said sound box to one or more of said support struts of said frame; and a striking bar, having a first end and a second end, wherein said first end is secured to said elongated shaft and said second end engages said sound box, such that as said frame rotates around said elongated shaft in response to wind, said second end of said striking bar engages said sound box and generates the animal call.

19. A method for using a collapsible decoy by a user to attract an animal or fowl to come into close proximity to the collapsible decoy, comprising the steps of:

(a) opening said collapsible decoy, said collapsible decoy comprising:

a frame having an elongated shaft, said elongated shaft having a handle end and a top end;

an opening mechanism that is slidably disposed on said elongated shaft resulting in said frame having a closed position and an open position;

a plurality of support struts pivotally attached to said opening mechanism;

a head strut for forming a head and neck of an animal or fowl, connected to and extending from one or more of said support struts when in said open position;

wherein in said closed position, said opening mechanism is positioned at said handle end of said elongated shaft and said plurality of support struts are collapsed against said elongated shaft, and wherein in said open position, said opening mechanism is positioned at said top end of said elongated shaft and said plurality of support struts and said head strut are extended outward from said elongated shaft; and a cover disposed over said plurality of support struts and said head strut such that when said frame is in the open position, said cover creates an appearance of an animal or fowl having a body portion, a neck portion, and head portion;

(b) securing said collapsible decoy to the ground or a tree; and (c) observing by the user of said collapsible decoy for the approach of an animal or fowl to come into close proximity to said collapsible decoy.

20. The method for using a collapsible decoy according to claim 19, further comprising the steps of:

(c) removing said collapsible decoy from the ground or tree; and (d) closing said collapsible decoy into said closed position.

21. The method for using a collapsible decoy according to claim 20, further comprising the steps of:

(e) storing said collapsible decoy in a bag.

* * * * *